United States Patent [19]

Fayed

[11] Patent Number: 5,830,363
[45] Date of Patent: Nov. 3, 1998

[54] PROCESS FOR REMOVING CONTAMINANTS

[76] Inventor: Muhammad E. Fayed, 790 Syer Drive, Milton, Ontario, Canada, L7T 4E3

[21] Appl. No.: 736,210

[22] Filed: Oct. 25, 1996

Related U.S. Application Data

[60] Provisional application No. 60/007,044, Oct. 25, 1995.

[51] Int. Cl.$^6$ ........................................................ C02F 1/28
[52] U.S. Cl. ............................ 210/691; 210/747; 210/909
[58] Field of Search ...................................... 210/691, 909, 210/924, 908, 747

[56] References Cited

U.S. PATENT DOCUMENTS 4,061,573  12/1977  Biron ........................................ 210/924
4,891,320   1/1990  Aust et al. ................................ 210/909
4,969,774  11/1990  Arseneault et al. ..................... 210/691

*Primary Examiner*—Ivars Cintins

[57] ABSTRACT

A method for removing contaminants from fluids comprises contacting the fluid with an expanded material selected from popped corn, puffed rice and puffed wheat. The preferred expanded material is popped corn. The method is applicable to a wide range of organic and inorganic contaminants. Examples of contaminants include aromatic compounds such as polychlorinated biphenyls (PCBs), polychlorinated dibenzo furans (PCDFs), polychlorinated dibenzo dioxins (PCDDs), carbamates, sulphonamides, dichlorodiphenyl-trichloroethane (DDT), 2,4-dichlorophenoxyacetic acid (2,4-D), other compounds such as carbon disulphide, ethylene glycol, pesticides, oils, wood preservatives, pulp and paper bleaching compounds. Other examples include inorganic compounds or organo-metallic compounds, e.g. those containing aluminum, antimony, barium, cadmium, cobalt, chromium, copper, iron, lead, mercury, molybdenum, nickel, silver, tin, titanium, vanadium and zinc.

3 Claims, No Drawings

PROCESS FOR REMOVING CONTAMINANTS

This application claims benefit of USC Provisional application Ser. No. 60/007,044, filed Oct. 25, 1995.

FIELD OF THE INVENTION

The present invention relates to a method of removing chemical contaminants from waste streams.

BACKGROUND TO THE INVENTION

It is known to use natural materials such as sphagnum moss for absorbing materials such as oils from contaminated substrates such as soil. Absorption of the oils seems to be dependent upon the high surface area of the sphagnum moss. It is unsuitable, however for removing trace quantities of contaminants. Starch xanthates have also been used for removal of metals but carbon disulphide is released during the removal process. A method has been found which is particularly efficacious for removing very low concentrations of organic chemicals and heavy metals, and is relatively inexpensive. Surprisingly it has been found that this absorption can be accommodated using commonly available materials which are derived from natural products.

SUMMARY OF THE INVENTION

Accordingly the present invention provides a method for removing contaminants from an aqueous or gaseous fluid comprising contacting the fluid with an expanded material selected from popped corn, puffed rice and puffed wheat.

Popped corn is the preferred material.

In one embodiment the fluid is water which is contaminated with a contaminant selected from organic compounds and metallic compounds.

In another embodiment the fluid is a gas contaminated with an organic compound.

The organic compounds may be simple compounds like carbon disulphide, aliphatic compounds like ethylene glycol or aromatic compounds like polychlorinated biphenyls (PCBs), polychlorinated dibenzo furans (PCDFs) and polychlorinated dibenzo dioxins (PCDDs).

The metallic compounds may be inorganic or organo-metallic compounds. The inorganic compounds contain metal ions, particularly the heavier metals. The breadth of metals which may be removed using the present invention is exemplified by metals such as aluminum, antimony, barium, cadmium, cobalt, chromium, copper, iron, lead, mercury, molybdenum, nickel, silver, tin, titanium, vanadium, zinc.

Other examples of contaminants may be classified as pesticides, oils, wood preservatives, bleaching agents used in the pulp and paper industry, and other chemical contaminants. e.g. carbamates, sulphonamides, dichlorodiphenyl-trichloroethane (DDT), 2,4-dichlorophenoxyacetic acid (2,4-D), and the like,

DETAILED DESCRIPTION OF PREFERRED EMBODIMENTS

The present invention makes use of expanded materials, i.e. popped corn, puffed rice or puffed wheat. Popped corn is the preferred material. It is made from a particular type of corn known as popcorn, which has been bred for its qualities to "pop" when heated. It is understood that the latin name for such popcorn is *zea mays everta*. Two types of popcorn are used commercially, i.e. those known as the mushroom kind and the other known as the snowflake kind, the snowflake kind being relatively flat after popping, and the mushroom kind being bulky. The processes for expanding corn, rice and wheat to make popped corn, puffed rice and puffed wheat are known and involve rapid heating of the popcorn, rice or wheat. Heating is usually provided by contact of the appropriate variety of corn, rice or wheat with a hot fluid, e.g. air, oil. Expansion can also be attained by microwave or open flame methods. The expanded materials are sometimes available commercially as breakfast cereals or as snacks.

These expanded materials may be used for removing chemical contaminants from water bodies and soils. Examples of water bodies include mine tailings ponds, harbours, lakes, rivers, sewage streams, underground water. As indicated hereinbefore, the range of organic compounds for which the invention is believed effective is broad and includes compounds such as carbon disulphide, ethylene glycol, polychlorinated biphenyls (PCBs), polychlorinated dibenzo furans (PCBFS) and polychlorinated dibenzo dioxins (PCDDs), pesticides, oils, wood preservatives, pulp and paper bleaching compounds and the like. The range of metallic compounds is also broad and includes salts of metals, e.g. acetates, bromides, chlorides, nitrates, sulphates, sulphides, and organo-metallic compounds, e.g. methylmagnesium iodide, metallic alkyls such as butyllithium, tetraethyl lead, triethyl aluminum, tetrabutyl titanate, dibutyl tin laurate, copper phthalocyanate, zineb, ethylmercuric acetate, stereato chromic chloride, ferrocene and nickel carbonyl.

Because the expanded material, i.e. popped corn, puffed rice and puffed wheat, contains entrapped air, they tend to float on water and therefore it is desirable to contain these materials in a textile material or similar, e.g. a bag made from cotton, burlap, woven polyolefin tapes, which contains heavier-than-water material, e.g. glass beads, sand, stones or the like. This permits the expanded cereal to be brought in contact with the contaminants within the water body. The water is allowed to remain in contact with the water for a period of time, sometimes as little as a few minutes but sometimes as long as several days. Although the mechanism is not clearly understood, chemical contaminants seem to be absorbed by the expanded material, thus removing them from the water body. The expanded material is then removed from the water body and may be disposed of, for example in landfill or dried and burned.

In order to remediate contaminated soil it is usual to wash the soil. The present invention may be used to remove contaminants from the wash water. Alternatively the soil, expanded material and some water may be mixed in a suspension, slurry or the like and then the expanded material and soil be separated by flooding with water and allowing the soil to sink and the expanded material to float. As used herein the term "soil" includes sand and the like.

The present method using the expanded material to remove contaminants seems to work not only in water bodies such as lakes, but also in relatively harsh conditions where the pH may be low, e.g. in mine tailings ponds. A water stream to be decontaminated need not be in situ as with a pond, tank or similar. The contaminated water may be passed, e.g. pumped over a bed of expanded material in a tower or other vessel in a manner similar to filtration. The necessary residence time in the expanded material bed can be easily determined by simple experimentation.

With gaseous fluid streams, the expanded material may be placed in a fluid bed and the contaminated fluid passed over the expanded material. In such a manner, contaminants such as solvents, carbon disulphide and paint fumes may be removed from air streams.

The invention may also be better understood by reference to the following examples, in which the popped corn was made from the mushroom kind and had a particle size range, after popping, of from 1.5 mm to 3 cm.

EXAMPLE I

Sample A of water, containing metal contaminants taken from an automotive plant was split into two sub-samples for testing and analysis. The first sub-sample was filtered through a Whatman® No. 1 filter and the resulting filtrate analyzed for concentrations of certain elements using a conventional inductively coupled plasma (ICP) procedure. Mercury concentrations were measured using conventional cold vapour flame techniques. The second sub-sample, weighing 238 g, was taken and to it was added 8.3 g of popped corn. The popped corn was stirred in the water sample for about 12 minutes. The second sub-sample was then filtered through a Whatman® No. 1 filter and the resulting filtrate analyzed for metal concentrations using the above-described analytical methods. The test results are shown in Table I.

TABLE I

| Concentration (ppm) | First Sample | Second Sample |
| --- | --- | --- |
| Boron | <0.1 | <0.1 |
| Sulphur (as $SO_3$) | 18.3 | 18.3 |
| Cobalt | <0.1 | <0.1 |
| Titanium | <0.1 | <0.1 |
| Tin | <0.1 | <0.1 |
| Iron | 0.1 | <0.1 |
| Copper | <0.1 | <0.1 |
| Chromium | <0.1 | <0.1 |
| Molybdenum | <0.1 | <0.1 |
| Nickel | <0.1 | <0.1 |
| Vanadium | <0.1 | <0.1 |
| Zinc | 1.5 | 1.0 |
| Lead | <0.1 | <0.1 |
| Barium | <0.1 | <0.1 |

This example shows a reduction in zinc concentrations under the conditions of the experiment. Those elements with a concentration of <0.1 ppm were below the detection limit of the analysis and no conclusion regarding removal could be made.

EXAMPLE II

A similar experiment to Example I was conducted with Sample B which was water run-off from a Toronto, Ontario location. Sample B was split into two sub-samples for testing and analysis; the first sub-sample was without treatment with popped corn and the second sub-sample was with treatment, i.e. 11.3 g popped corn to 317 g of the second sub-sample. The test results are shown in Table II.

TABLE II

| Concentration (ppm) | First Sample | Second Sample |
| --- | --- | --- |
| Titanium | 0.069 | 0.033 |
| Arsenic | 0.029 | 0.026 |
| Mercury | 0.061 | 0.007 |
| Selenium | 0.033 | 0.012 |
| Molybdenum | 0.204 | 0.175 |
| Antimony | 0.045 | 0.003 |
| Tungsten | 0.029 | 0.017 |
| Zinc | 1.11 | 0.136 |
| Bismuth | 0.015 | 0.002 |

This example shows a reductions of metal concentrations of from 10%, e.g. arsenic to about 90%, e.g. antimony, bismuth, mercury and zinc, starting from very low concentrations in the first instance.

EXAMPLE III

Sample C, which was effluent from a mine tailings pond was taken and split into two sub-samples for testing and analysis. Sample C contained about 5% wt./wt. sulphuric acid. The first sub-sample was filtered through a Whatman® GFC No. 40 glass filter and the resulting filtrate analyzed for concentrations of nickel and ferrous ions using conventional ICP procedures. The second sub-sample, weighing 82.4 g, was taken and to it was added 2.5 g of popped corn. The popped corn was stirred in the second sub-sample. The second sample was then filtered through a Whatman® No. 1 filter and the resulting filtrate analyzed for concentrations of nickel and ferrous ions using conventional ICP procedures. The concentrations of nickel and ferrous ions in the first sample, i.e. before treatment, were 5 ppm and 1400 ppm respectively. The concentrations of nickel and ferrous ions in the second sample, i.e. after treatment with popped corn, were 0.266 ppm and 349 ppm respectively. This clearly demonstrates the efficacy of the present method even in harsh environments, i.e. with low pH.

EXAMPLE IV

Two further samples (D and E) of water, containing metallic salt were prepared from standard metal solutions and diluted with reverse osmosis deionized water. Two sub-samples of each were taken. The first sub-samples were analyzed for metal content without treatment with popped corn. The second sub-samples were analyzed after treatment with popped corn (120 g of water to 3 g of popped corn in each case). The metals were analyzed using conventional ICP procedures. The results are shown in Table III.

TABLE III

| | Sample D | | Sample E | |
| --- | --- | --- | --- | --- |
| Concentration (ppm) | First Sample | Second Sample | First Sample | Second Sample |
| Silver | 0.2400 | 0.0741 | 0.0243 | 0.0030 |
| Aluminium | 3.0000 | 2.9530 | 0.3166 | 0.0200 |
| Boron | 3.0000 | 0.0408 | 0.2420 | 0.0100 |
| Barium | 3.0000 | 0.0168 | 0.2457 | 0.0020 |
| Cadmium | 3.0000 | 2.8650 | 0.2899 | 0.0050 |
| Cobalt | 3.0000 | 2.6790 | 0.2810 | 0.0050 |
| Chromium | 3.0000 | 0.0500 | 0.0050 | 0.0030 |
| Copper | 3.0000 | 2.9840 | 0.2948 | 0.0050 |
| Iron | 3.0000 | 2.2780 | 0.2829 | 0.0050 |
| Manganese | 3.0000 | 0.0829 | 0.0050 | 0.0060 |
| Molybdenum | 3.0000 | 0.0600 | 0.0060 | 0.0060 |
| Nickel | 3.0000 | 1.9720 | 0.2998 | 0.0060 |
| Phosphorus | 3.0000 | 2.9490 | 0.1997 | 0.0595 |
| Lead | 3.0000 | 2.7730 | 0.2974 | 0.0060 |
| Tin | 3.0000 | 1.2870 | 0.2420 | 0.0050 |
| Titanium | 3.0000 | 2.0730 | 0.2889 | 0.0060 |
| Vanadium | 3.0000 | 0.0060 | 0.2000 | 0.0200 |
| Zinc | 3.0000 | 2.8730 | 0.3032 | 0.0052 |

These show varying degrees of removal of contaminants at two different initial concentration levels. Removal of up to 99% of the contaminants were realized.

EXAMPLE V

Three water samples F, G and H, containing polychlorinated biphenyls (PCBS) were taken. Each was split into two sub-samples. The first sub-samples were analyzed for PCBs without treatment with popped corn. The second sub-samples were analyzed for PCBs after contacting 101 g of the sub-sample with 2.7 g of popped corn. The PCBs were analyzed using EPA Method No. 508 for the determination of chlorinated pesticides in water by gas chromatography and electrocaptive detector. The concentrations of PCBs in the first sub-samples, i.e. before treatment, were 15 ppm, 3.0 ppm and 10.5 ppb for sub-samples F, G and H respectively. The concentrations of PCBs in the second sub-samples, i.e. after treatment with popped corn, were 0.00, 0.00 and 1.60 ppb for sub-samples F, G and H respectively, the first two being not measurable with the analytical method and the third being within the detection limit of the analytical method. This clearly demonstrates the efficacy of the present method for removing small concentrations of certain aromatic compounds.

EXAMPLE VI

Seven 100 ml water samples J, K, L, M, N, O and P, containing ethylene glycol were taken. Each sample was split into two sub-samples. The first of each of the sub-samples were analyzed for ethylene glycol without treatment with popped corn. The second of each sub-samples were analyzed for ethylene glycol after contacting the sub-sample with a small quantity of popped corn (in the range of about 2–3 g) for one minute. The ethylene glycol in samples J, K, L and M were measured using a Hach field kit and a standard COBAS calorimetric analysis with a UV visual detector. The detection limit for this method is about 10 ppm. The ethylene glycol in samples N, O and P were measured with a more sensitive gas chromatographic method, using a Hewlett Packard (trade mark) 5980 gas chromatograph with a polar 0.53 mm Carbowax (trade mark) biphasic column. The detection limit for this method is about 0.5 ppm. The results, in parts per million ethylene glycol, are shown in Table IV.

TABLE IV

| Sample | First Sample (Initial concn.) | Second Sample (After treatment) |
| --- | --- | --- |
| J | 5000 | <300 |
| K | 1000 | <25 |
| L | 500 | <25 |
| M | 100 | <25 |
| N | 100 | 16 |
| O | 50 | 7 |
| P | 20 | 4 |

This clearly shows the efficacy of the method of the present invention with another simple organic compound.

I claim:

1. A method for removing contaminants from water in which the contaminants are present in low concentrations, comprising contacting the water with an expanded material selected from the group consisting of popped corn, puffed rice and puffed wheat in a manner selected from the group consisting of immersing the expanded material in the water and passing the water through a bed of the expanded material, for a time sufficient to remove a substantial portion of the contaminants, and removing contaminated expanded material from contact with the water, said water being contaminated with an aromatic compound selected from the group consisting of polychlorinated biphenyls (PCBs), polychlorinated dibenzo furans (PCDFs), polychlorinated dibenzo dioxins (PCDDs), carbamates, sulphonamides, dichlorodiphenyltrichloroethane (DDT), and 2,4-dichlorophenoxyacetic acid (2,4-D).

2. A method according to claim 1 wherein the expanded material is popped corn.

3. A method according to claim 1 wherein the water is in a mine tailings pond.

* * * * *